(12) United States Patent
Grimwade

(10) Patent No.: US 7,367,174 B2
(45) Date of Patent: May 6, 2008

(54) ROTARY LAWN MOWER WITH PIVOTAL MULCH DOOR

(75) Inventor: Stephen J. Grimwade, Huntingdon (GB)

(73) Assignee: The Toro Company, Bloomington, MN (US)

( * ) Notice: Subject to any disclaimer, the term of this patent is extended or adjusted under 35 U.S.C. 154(b) by 80 days.

(21) Appl. No.: 11/061,377

(22) Filed: Feb. 18, 2005

(65) Prior Publication Data

US 2006/0185341 A1  Aug. 24, 2006

(51) Int. Cl.
*A01D 67/00* (2006.01)

(52) U.S. Cl. .......................................... 56/320.2; 56/2

(58) Field of Classification Search ............... 56/2, 56/320.1, 320.2, 5, 13.3, 16.6, DIG. 20, 194, 56/202
See application file for complete search history.

(56) References Cited

U.S. PATENT DOCUMENTS

| | | | | |
|---|---|---|---|---|
| 2,756,556 A * | 7/1956 | Watkins | ........................ | 56/189 |
| 3,192,692 A | 7/1965 | Slemmons | | |
| 3,949,540 A * | 4/1976 | Christopherson et al. | ..... | 56/202 |
| 4,129,977 A | 12/1978 | Comer | | |
| 4,214,424 A * | 7/1980 | Gobin | ......................... | 56/202 |
| 4,466,235 A * | 8/1984 | Cole | ........................... | 56/16.9 |
| 4,854,115 A * | 8/1989 | Jones et al. | ................. | 56/320.1 |
| 5,033,260 A * | 7/1991 | Jerry | ......................... | 56/320.2 |
| 5,090,183 A * | 2/1992 | Thorud et al. | .................... | 56/2 |
| 5,179,823 A | 1/1993 | Pace | | |
| 5,410,867 A | 5/1995 | Plamper et al. | | |
| 5,638,667 A | 6/1997 | Ellson et al. | | |
| 5,884,463 A | 3/1999 | Darzinskis | | |
| 6,609,358 B1 | 8/2003 | Schmidt | | |
| 6,735,932 B2 * | 5/2004 | Osborne | ..................... | 56/320.1 |
| 6,751,937 B2 * | 6/2004 | Kobayashi et al. | ............ | 56/202 |
| 6,862,875 B2 * | 3/2005 | Iida et al. | .................. | 56/320.2 |
| 6,910,324 B2 * | 6/2005 | Kakuk | ......................... | 56/255 |
| 2003/0145572 A1 * | 8/2003 | Kakuk | ......................... | 56/320.1 |
| 2003/0182916 A1 * | 10/2003 | Iida et al. | ...................... | 56/202 |

FOREIGN PATENT DOCUMENTS

DE  41 20 278  12/1992

* cited by examiner

*Primary Examiner*—Thomas B. Will
*Assistant Examiner*—Jamie L McGowan
(74) *Attorney, Agent, or Firm*—James W. Miller

(57) ABSTRACT

A rotary walk behind lawn mower has a wheeled cutting deck with a downwardly facing cutting chamber. A rotatable cutting blade is contained inside the cutting chamber above a lower edge of a peripheral sidewall and beneath a central hub, an annular channel being formed between the sidewall and the hub of the cutting chamber for receiving grass clippings from the cutting blade. A portion of the peripheral sidewall of the cutting chamber above the level of the cutting blade and a portion of a top wall of the cutting chamber form a pivotal mulch door for opening and closing the annular channel in which the grass clippings are moving.

10 Claims, 14 Drawing Sheets

ROTARY LAWN MOWER WITH PIVOTAL MULCH DOOR

TECHNICAL FIELD

This invention relates generally to rotary lawn mowers that are convertible between a mulching mode of operation and a grass discharge/collection mode of operation.

BACKGROUND OF THE INVENTION

Walk behind lawn mowers are well known outdoor power equipment units for mowing grass. Such mowers comprise a movable cutting deck having a cutting chamber that carries a substantially horizontal rotary cutting blade. A handle extends upwardly and rearwardly from the cutting deck. An operator grips a handle grip on the handle and walks behind the mower to guide and control the mower.

The cutting chamber is formed on the underside of the cutting deck and includes a top wall and a downwardly extending, peripheral side wall. The cutting chamber has an open bottom facing the ground so that the blade rotating inside the cutting chamber can contact and sever grass as the cutting chamber moves over the ground. The cutting chamber often includes a central hub that defines an annular channel between the hub and the sidewall of the cutting chamber. The grass clippings created by the blade will circulate through at least a portion of this annular channel before exiting the cutting chamber through an exit tunnel.

The exit tunnel is typically U-shaped having a top wall and spaced apart side walls. The exit tunnel rises in height from a front end thereof to a rear end thereof. The exit tunnel receives the grass clippings from the cutting chamber and conducts the grass clippings to a rear discharge opening on the exit tunnel. The grass clippings can be discharged through the discharge opening onto the ground or can be collected in a grass collection container when such a container is connected to the discharge opening. This is the discharge/collection mode of operation of the lawn mower.

The rear discharge opening of the exit tunnel can be selectively closed by a pivotal door which pivots about a substantially horizontal pivot axis adjacent the top wall at the rear of the exit tunnel. Thus, the door can be pivoted upwardly and forwardly inside the exit tunnel to lie flat against the top wall of the exit tunnel to open the rear discharge opening when the mower is in the aforementioned discharge/collection mode of operation. Alternatively, the door can be pivoted rearwardly and downwardly to hang generally vertically downwardly from its pivot axis to block or close the rear discharge opening of the exit tunnel. This places the mower in a mulching mode of operation.

When a mower is placed into its mulching mode simply by closing the pivotal door at the rear of the exit tunnel, this leaves the length of the exit tunnel forward of the door open to the cutting chamber. Thus, grass clippings can still enter the exit tunnel and will quickly pack inside the exit tunnel against the closed door. This will detract from the mulching performance of the mower since grass clippings can dribble or fall out of the front of the tunnel in an unpredictable manner and leave clumps of clippings on the ground. In addition, the packed clippings have to be cleaned out of the exit tunnel from the inside of the cutting chamber in order to open the pivotal door to place the mower into its discharge/collection mode of operation.

Some mowers of this type use a grass plug that can be inserted into the exit tunnel through the rear discharge opening when the pivotal door is open. The grass plug extends the length of the tunnel and keeps grass from entering the tunnel when the plug is in place. The insertion of the plug places the mower into its mulching mode of operation without having to close the pivotal door. U.S. Pat. No. 4,951,449 to Thorud, which is assigned to The Toro Company, the assignee of this invention, shows a mower of this type, i.e. a mower with a grass plug insertable into the exit tunnel to place the mower into its mulching mode of operation.

The grass plug approach to blocking the exit tunnel has a number of disadvantages. First, the grass plug can be quite difficult to remove from the exit tunnel after it has been in place for a period of time because dirt and grass clippings wedge between the walls of the plug and the walls of the exit tunnel. Thus, some users may not use the grass plug and instead may use only the pivotal door to block off the exit tunnel in the mulching mode of operation, thereby leading to the tunnel plugging difficulties which use of the grass plug was intended to overcome. Secondly, the grass plug is a separate part and is prone to being lost or misplaced. If the grass plug is misplaced or not readily at hand, the mower can be placed into the mulching mode of operation only by closing the pivotal door at the rear of the exit tunnel.

Moreover, using an exit tunnel to lead grass clippings out of a cutting chamber inherently detracts from the mulching performance of a lawn mower because the clippings are intended to travel in a path that leads out of the cutting chamber rather than encouraging the clippings to remain in the cutting chamber and being driven down into the cut grass path. Some mulching mowers are dedicated mowers in which the cutting chamber has no exits and whose shape is optimized to permit recirculation of the grass clippings and their eventual deposition in the cut grass path. However, such dedicated mulching mowers are not as desirable to many consumers as mowers which can be converted between a discharge/collection mode and a mulching mode of operation since such mowers cannot be used to bag the clippings. Accordingly, there is a need in the mower art for a mower which can be easily converted between the discharge/collection and mulching modes of operation and whose performance in the mulching mode of operation approaches that of a dedicated mulching mower.

SUMMARY OF THE INVENTION

One aspect of this invention relates to a lawn mower having a cutting deck supported for movement over the ground. A downwardly facing cutting chamber is provided on the cutting deck, the cutting chamber having a top wall and a circumferential peripheral sidewall. A rotatable cutting blade is located within the cutting chamber for cutting grass. A pivotal mulch door comprises a first portion from either the top wall or the sidewall of the cutting chamber. The mulch door is selectively pivotal relative to the cutting chamber between an open position in a discharge/collection mode of operation and a closed position in a mulching mode of operation.

Another aspect of this invention relates to a lawn mower which comprises a cutting deck with a downwardly facing cutting chamber. The cutting chamber has a peripheral sidewall surrounding a central hub such that an annular channel is formed between the sidewall and the hub. A rotatable cutting blade is contained inside the cutting chamber above a lower edge of the peripheral sidewall. The cutting blade rotates in a substantially horizontal cutting plane beneath the central hub to create grass clippings that are received within and circulate at least partially around the annular channel of the cutting chamber. At least a portion of the peripheral sidewall of the cutting chamber above the cutting plane forms a pivotal mulch door for opening and closing the annular channel.

Yet another aspect of this invention relates to a lawn mower which comprises a cutting deck supported for movement over the ground. A downwardly facing cutting chamber is provided on the cutting deck. A rotatable cutting blade is located within the cutting chamber for cutting grass. An exit tunnel discharges grass clippings from the cutting chamber, the exit tunnel having a pivot forming slot therein. A pivotal mulch door opens and closes the exit tunnel. The mulch door has a portion thereof inserted through the pivot forming slot to pivotally journal the pivotal mulch door to the exit tunnel.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
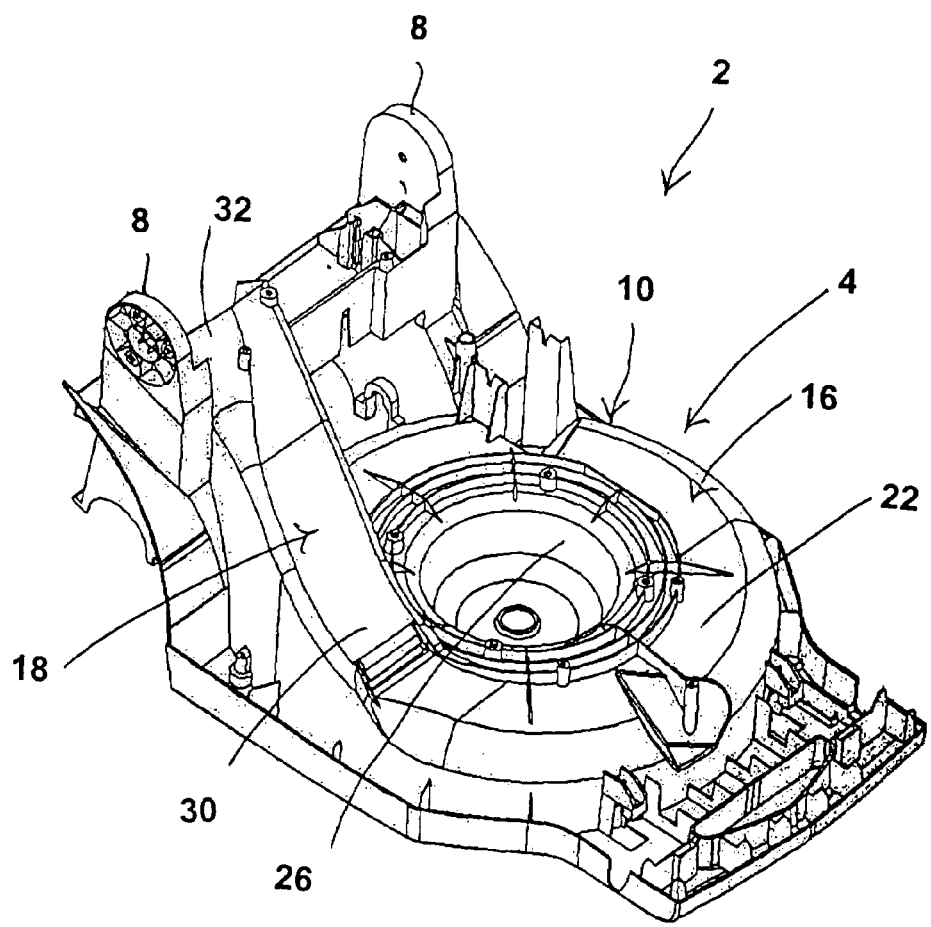
FIG. 1 is a perspective view of a portion of a lawn mower according to this invention, particularly illustrating a lower base of the cutting deck and the exit tunnel formed thereon.
Figure 2:
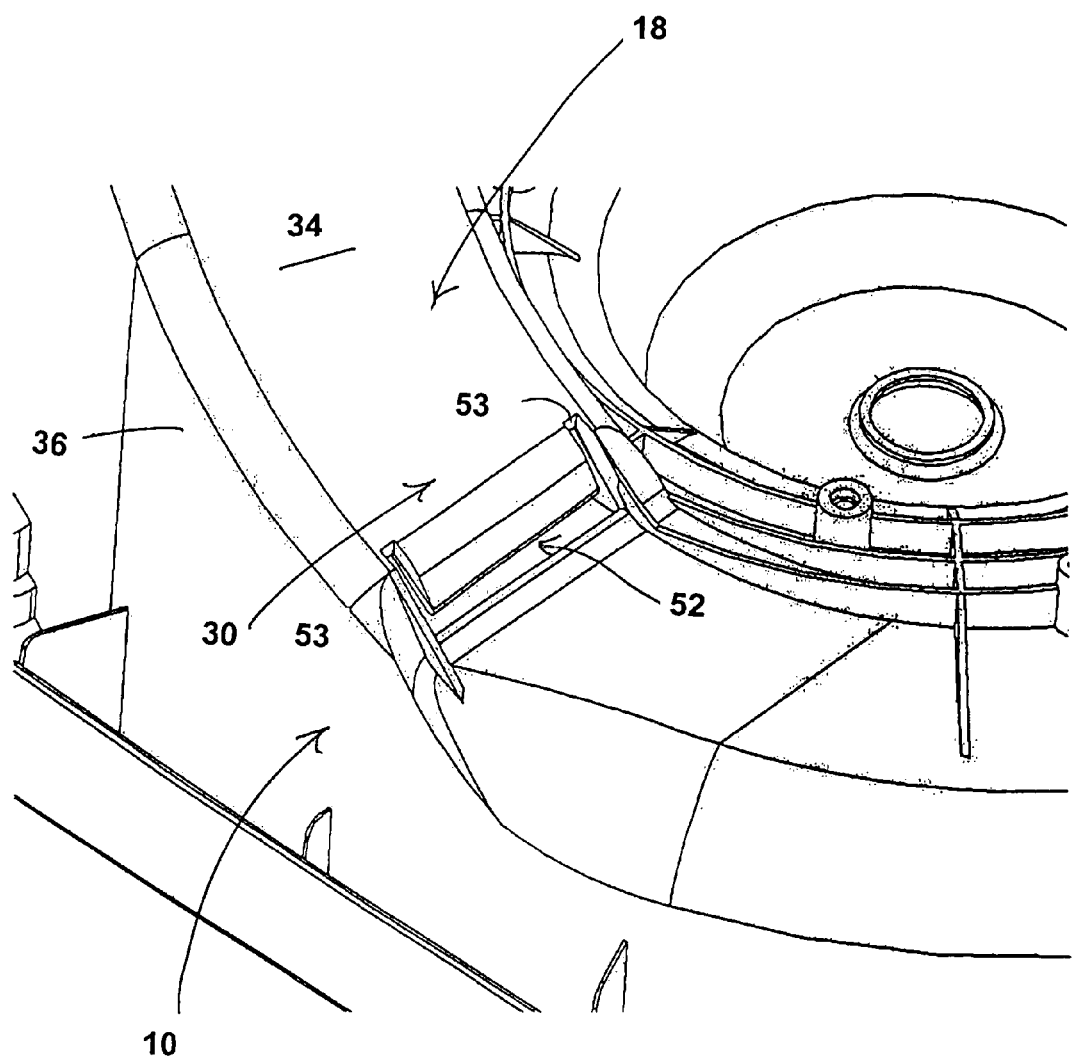
FIG. 2 is an enlarged perspective view of a portion of what is shown in FIG. 1, particularly illustrating the pivot forming slot in the front side of the exit tunnel.

A rotary lawn mower according to this invention is illustrated generally as 2. Mower 2 comprises a cutting deck 4 which is movably supported by a plurality of ground engaging wheels 6 for rolling over the ground. An upwardly and rearwardly extending handle assembly (not shown) includes a pair of spaced handle tubes (not shown) attached to handle mounts 8 at the upper rear corners of cutting deck 4. Thus, mower 2 shown herein is a walk mower in which an operator walks behind mower 2 during operation thereof and guides mower 2 while gripping and holding the handle assembly.

Mower 2 comprises a plastic molded lower base 10 and a plastic molded upper overlay 12. Lower base 10 and upper overlay 12 are molded separately from one another. Eventually, upper overlay 12 is mated with and superimposed on top of lower base 10 and is secured thereto in any suitable manner to form cutting deck 4. A motor shroud 14 is used on top of the central portion of upper overlay 12 to enclose a drive motor (not shown) of some type, e.g. an electric motor. See FIG. 6.

Figure 9:
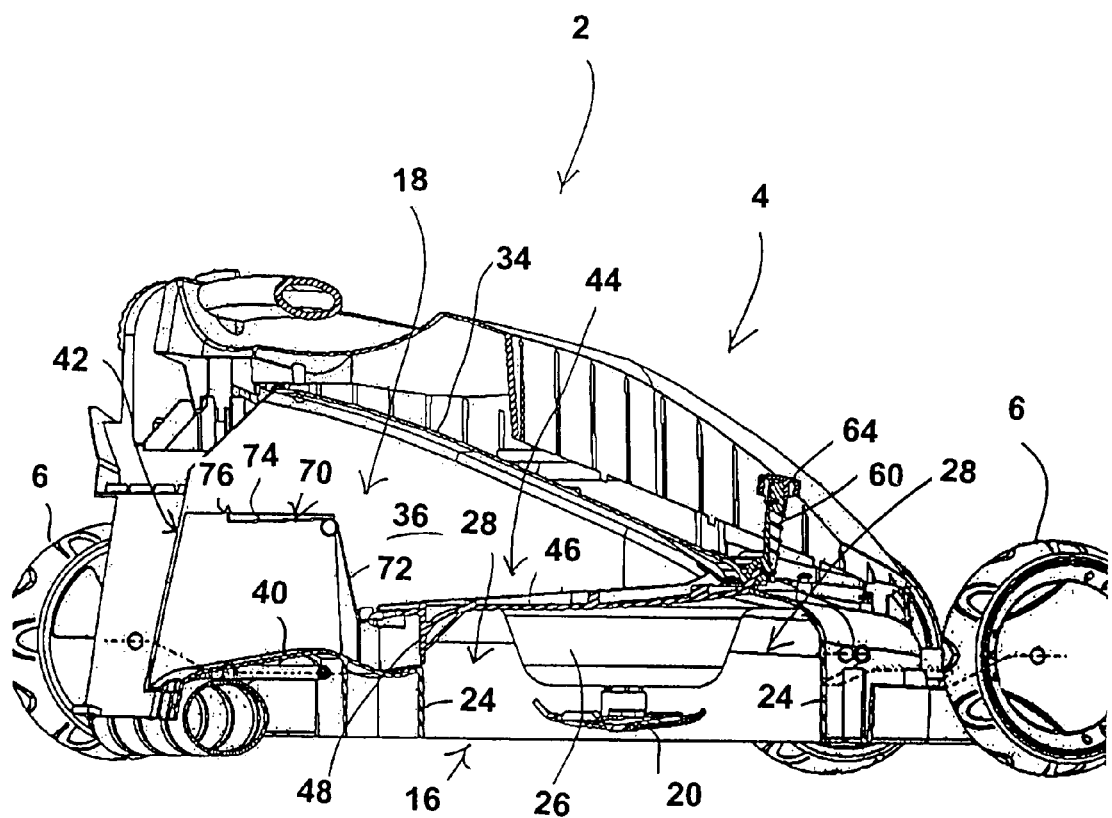
FIG. 9 is a longitudinal cross-sectional view taken through the exit tunnel on the cutting deck of the lawn mower shown in FIG. 1, particularly illustrating the pivotal mulch door in its closed mulching position.

Cutting deck 4 includes a downwardly facing cutting chamber 16 and a rearwardly extending exit tunnel 18 formed on lower base 10 of cutting deck 4. A rotary cutting blade 20 is rotatably carried in cutting chamber 16 for rotation in a substantially horizontal cutting plane. See FIG. 9. Cutting blade 20 is carried on the lower end of the shaft of the drive motor. Cutting blade 20 preferably includes upswept wings on the tips of blade 20 to help create an airflow in cutting chamber 16. This airflow propels the grass clippings created by cutting blade 20 circumferentially around at least a portion of cutting chamber 16 and through exit tunnel 18 when exit tunnel 18 is open.

Cutting chamber 16 includes a substantially horizontal top wall 22 and a substantially vertical sidewall 24 that depends downwardly from top wall 22 of cutting chamber 16. A central hub 26 extends downwardly from top wall 22 of cutting chamber 16 though not as far downwardly as the lower edge of sidewall 24. An annular grass clipping circulation channel 28 is thus formed in cutting chamber 16 between central hub 26 and sidewall 24. The grass clippings will circulate within channel 28 until the grass clippings are evacuated from channel 28, either by leaving channel 28 through exit tunnel 18 in a discharge/collection mode of operation or by being driven downwardly through the open bottom of cutting chamber 16 in a mulching mode of operation.

Exit tunnel 18 rises in height from a front end 30 that overlies a portion of cutting chamber 16 to a rear end 32 adjacent the rear side of cutting deck 4. Exit tunnel 18 is substantially U-shaped comprising a top wall 34 and spaced side walls 36. The bottom side of exit tunnel 18 is open along a forward portion of exit tunnel 18 overlying cutting chamber 16 to form an entrance 38 for the grass clippings into exit tunnel 18. The bottom side of exit tunnel 18 can be closed along a rearward portion of exit tunnel 18 rearwardly of cutting chamber 16 by a bottom floor 40. A rear discharge opening 42 is formed in rear end 32 of exit tunnel 18 to allow the grass clippings to leave exit tunnel 18 through rear discharge opening 42 when mower 2 is in its discharge/collection mode of operation.

A pivotal mulch door 44 is used to selectively open and close entrance 38 to exit tunnel 18. This pivotal mulch door 44 comprises a first portion 46 from top wall 22 of cutting chamber 16 and a second portion 48 from sidewall 24 of cutting chamber 16. Top wall and sidewall door portions 46 and 48 of mulch door 44 are integrally molded together as a single member from a plastic material similar to the high strength plastic used to form lower base 10 and upper overlay 12 of cutting deck 4. Mulch door 44 could be manufactured from other materials, such as pressed metal.

Figure 7:
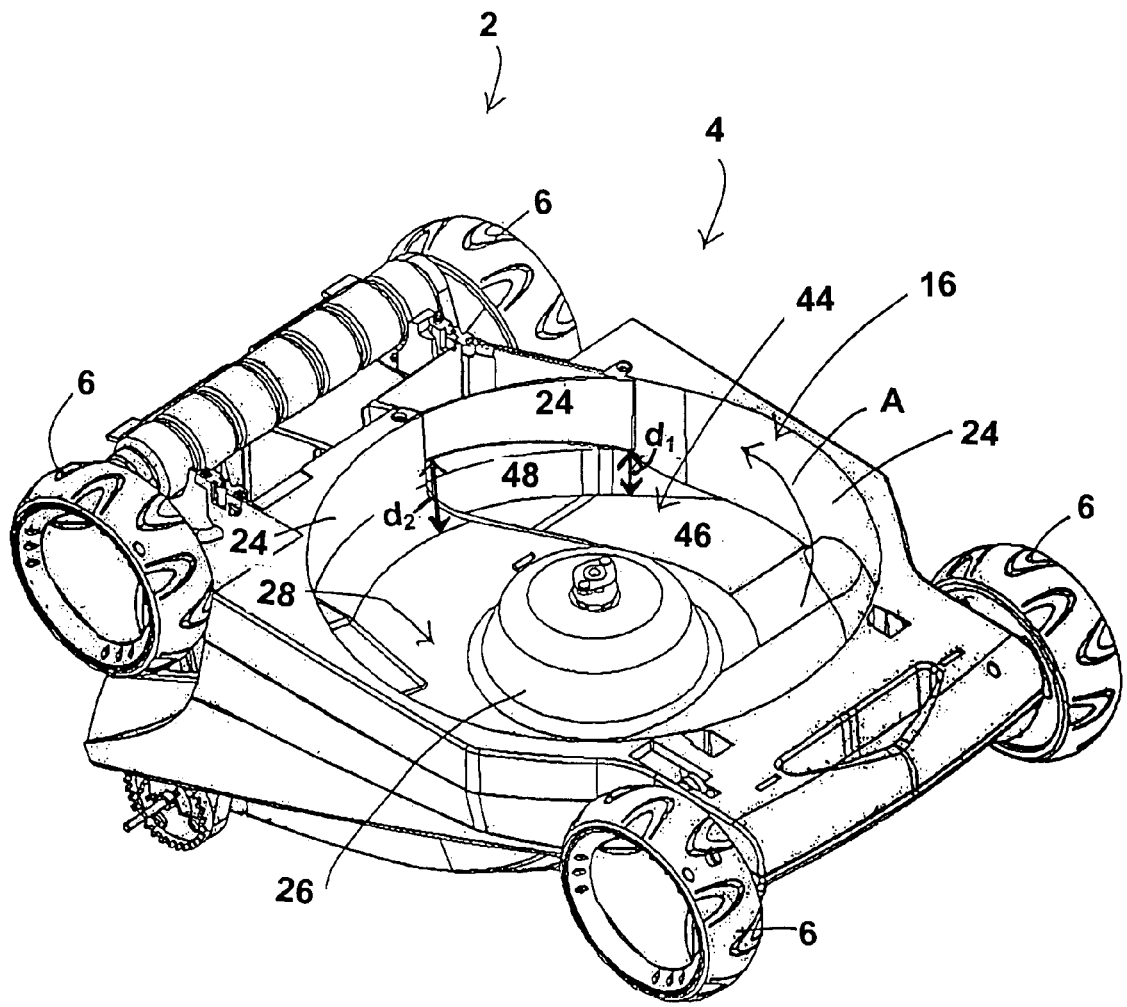
FIG. 7 is a perspective view of a portion of the lawn mower shown in FIG. 1, particularly illustrating an underside of the cutting deck and the cutting chamber formed therein with the pivotal mulch door shown in its closed position to place the cutting deck into its mulching mode of operation.
Figure 8:
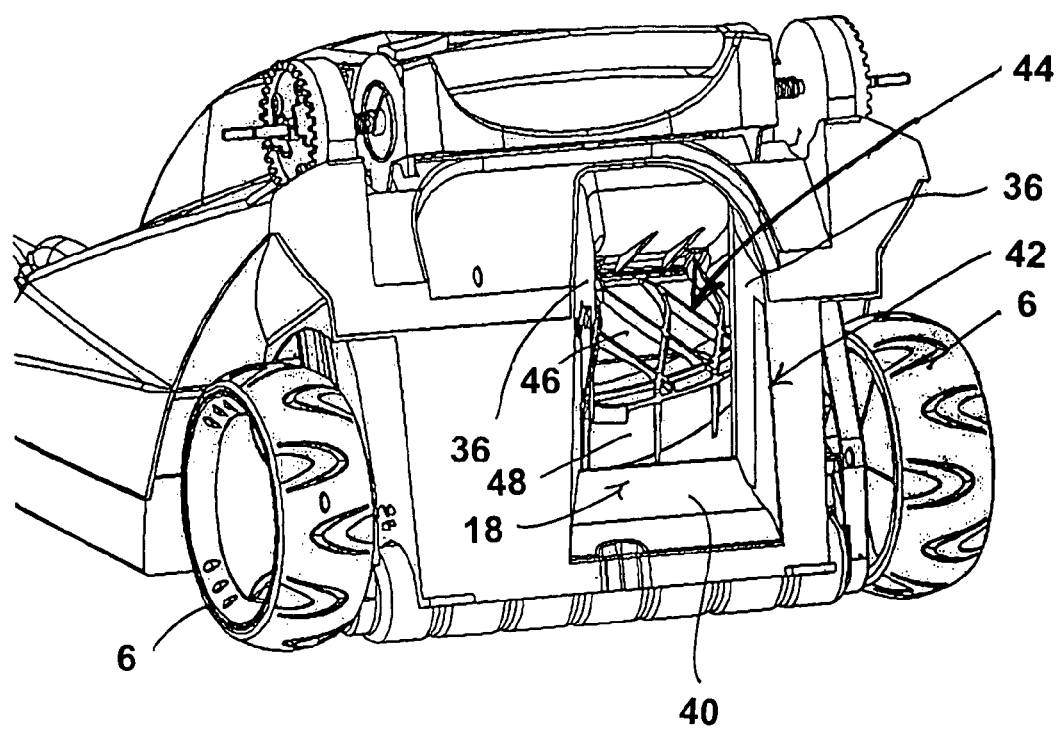
FIG. 8 is a perspective view of a portion of the lawn mower shown in FIG. 1 looking inwardly from the rear of the cutting deck through the rear discharge opening of the exit tunnel, particularly illustrating the pivotal mulch door in its closed mulching position.
Figure 10:
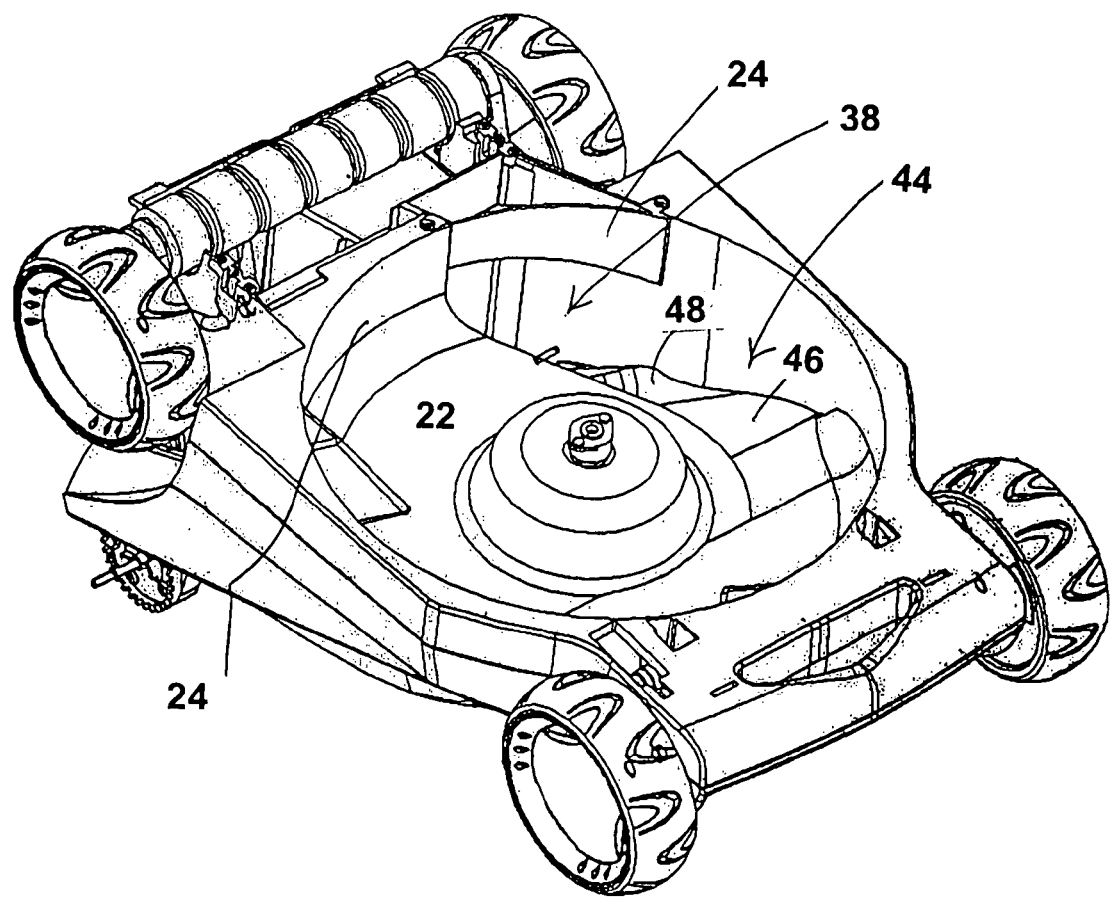
FIGS. 10-12 comprise views similar to FIGS. 7-9, but particularly illustrating the pivotal mulch door in its discharge/collection position to place the cutting deck into its discharge/collection mode of operation.
Figure 11:
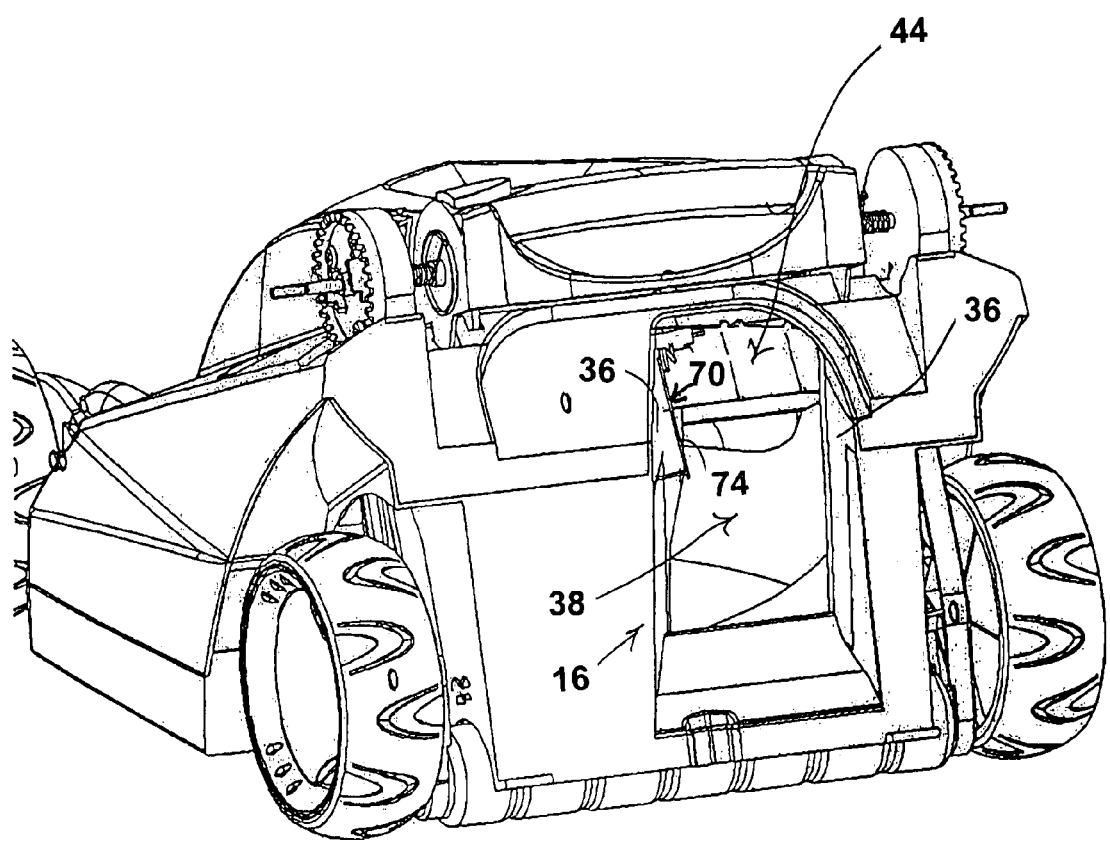
Figure 12:
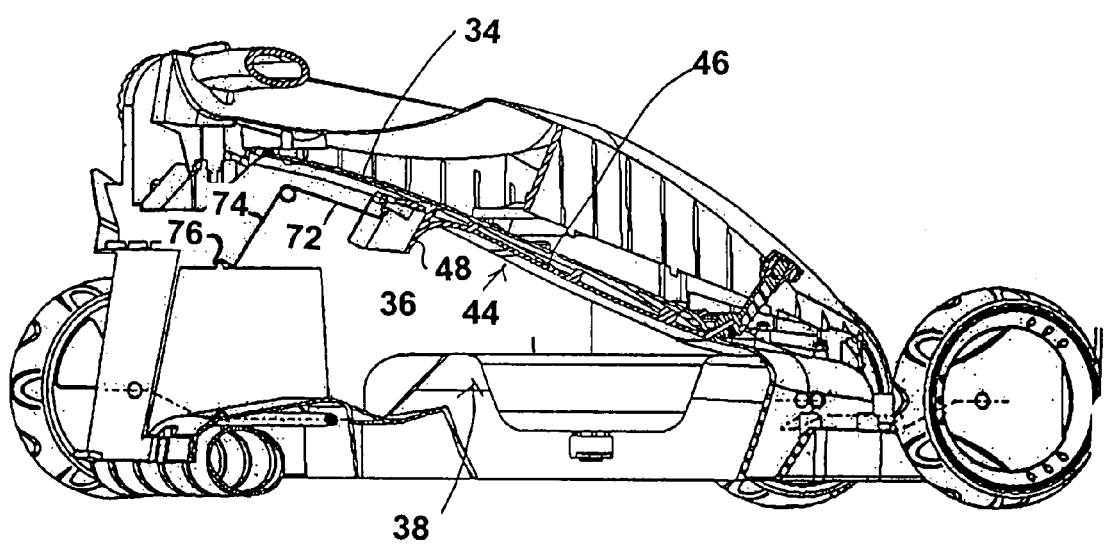

Sidewall door portion 48 increases in depth from one side to the other thereof in the direction of rotation of cutting blade 20. In other words, sidewall door portion 48 has a minimum depth d1 at the leading edge and has a maximum depth d2 at the trailing edge taken with respect to the direction of rotation of cutting blade 20, which direction of rotation is indicated by the arrow A in FIG. 7. In addition, the maximum depth of sidewall door portion 48 is less than the depth of sidewall 24 itself such that a fixed portion of sidewall 24 remains beneath sidewall door portion 48 of mulch door 44. See FIGS. 7 and 10. However, if desired, sidewall door portion 48 of mulch door 44 could have a substantially constant depth from one side to the other and/or the maximum depth of sidewall door portion 48 of mulch door 44 could be equal to the depth of sidewall 24 such that no portion of sidewall 24 remains beneath sidewall door portion 48 of mulch door 44.

Figure 13:
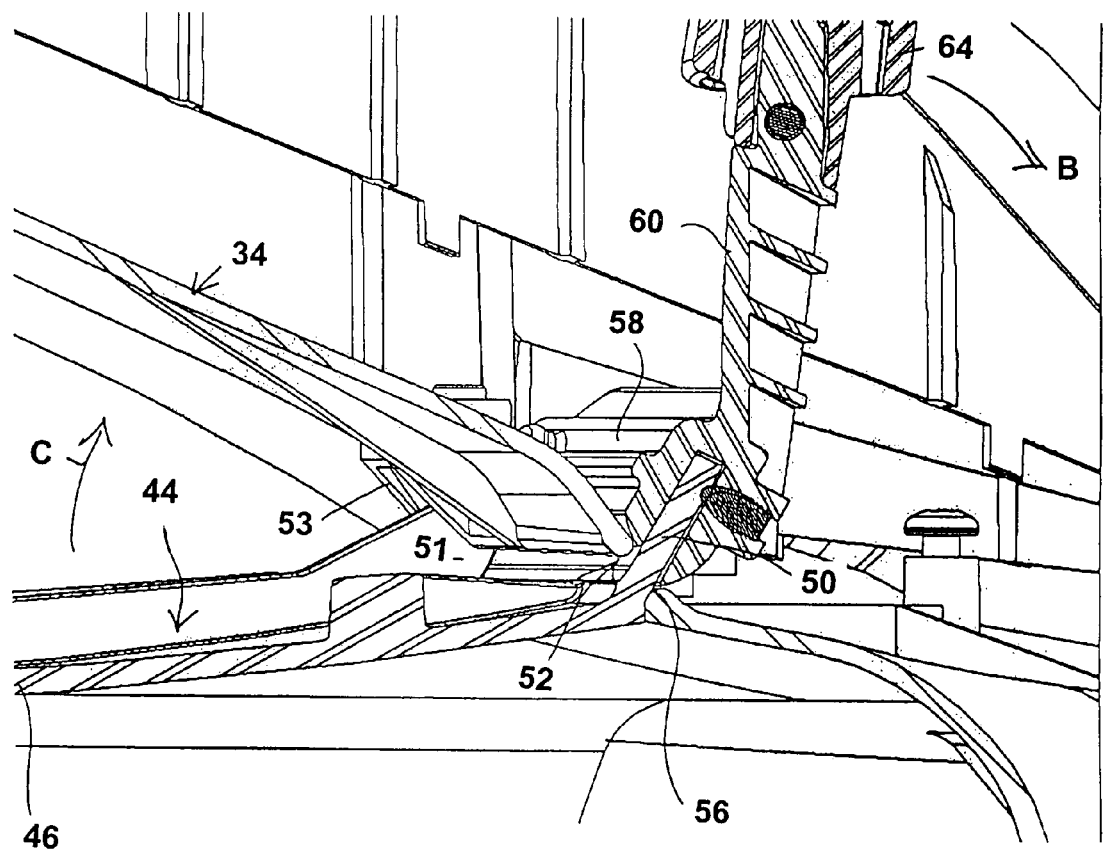
FIG. 13 is an enlarged cross-sectional view of a portion of the lawn mower shown in FIG. 1, particularly illustrating the pivot formed by the slot in the front end of the exit tunnel and the interaction between the pivot and the front lip on the pivotal mulch door with the pivotal mulch door shown in its closed mulching position.
Figure 14:
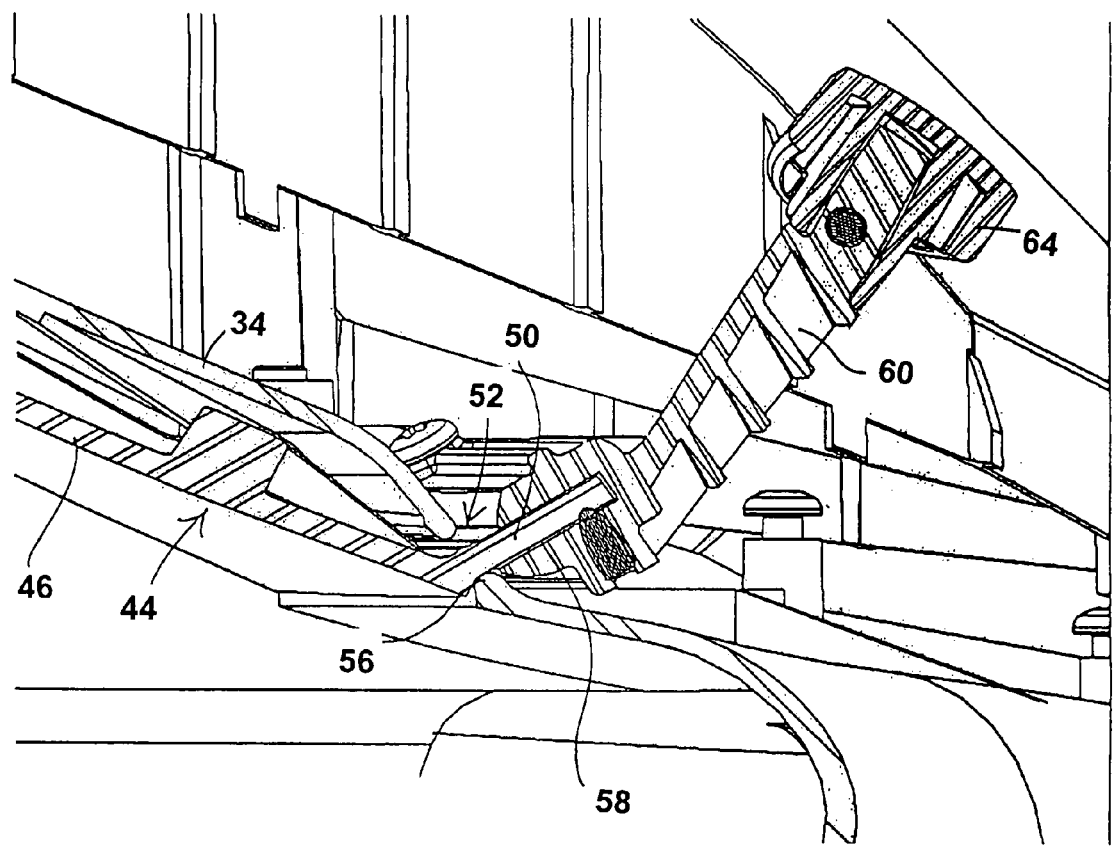
FIG. 14 is a view similar to FIG. 13, but particularly illustrating the pivotal mulch door in its open discharge/collection position.

Top wall door portion 46 has an upwardly inclined front lip 50 that projects through a slot 52 on top wall 22 of exit tunnel 18 at front end 30 of exit tunnel 18. Front lip 50 is an integrally molded part of top wall door portion 46 of mulch door 44. The lower edge of slot 52 forms a pivot 56 for front lip 50 as shown in FIGS. 13 and 14. Mulch door 44 can pivot upwardly and downwardly about pivot 56 as shown in FIGS. 13 and 14. Thus, mulch door 44 is pivotally mounted to exit tunnel 18 without requiring a separate pivot pin or shaft. However, other ways of pivotally mounting mulch door 44 could be used, such as a ball and socket mounting of front lip 50 to top wall 22 of exit tunnel 18.

Figure 3:
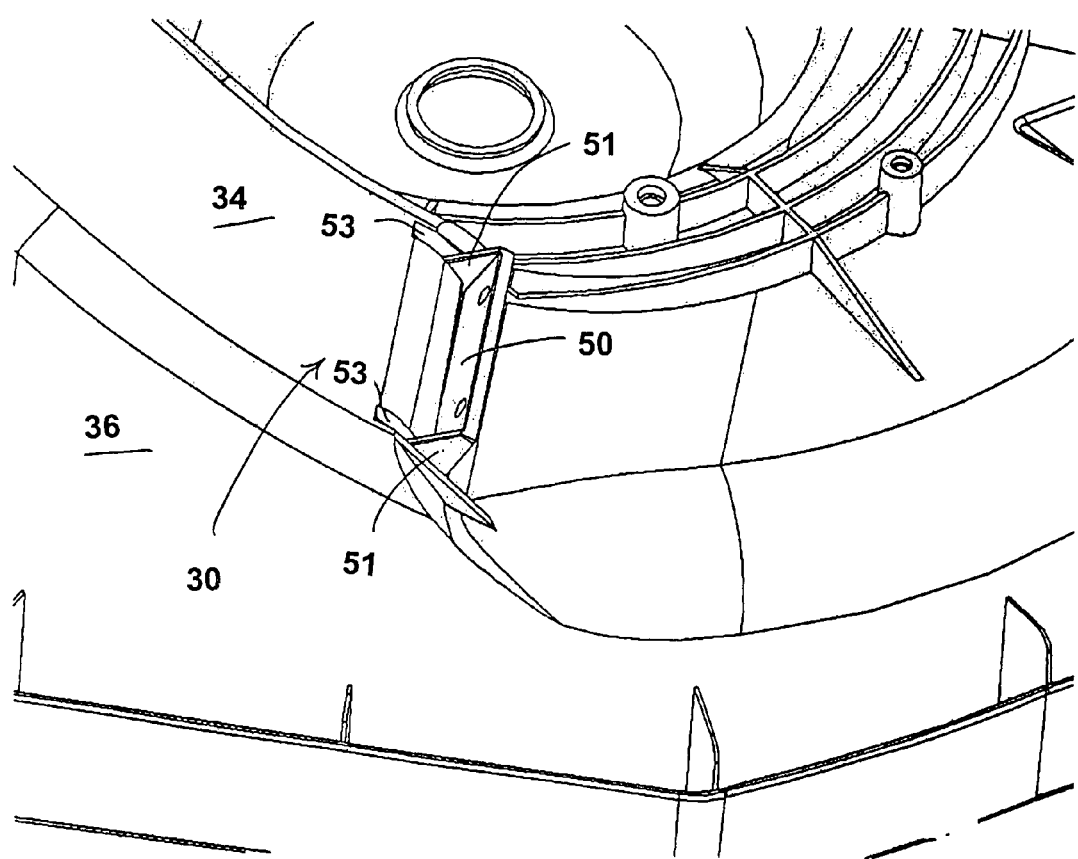
FIG. 3 is an enlarged perspective view similar to FIG. 2, particularly illustrating the front lip on the pivotal mulch door extending through the pivot forming slot in the front side of the exit tunnel.
Figure 4:
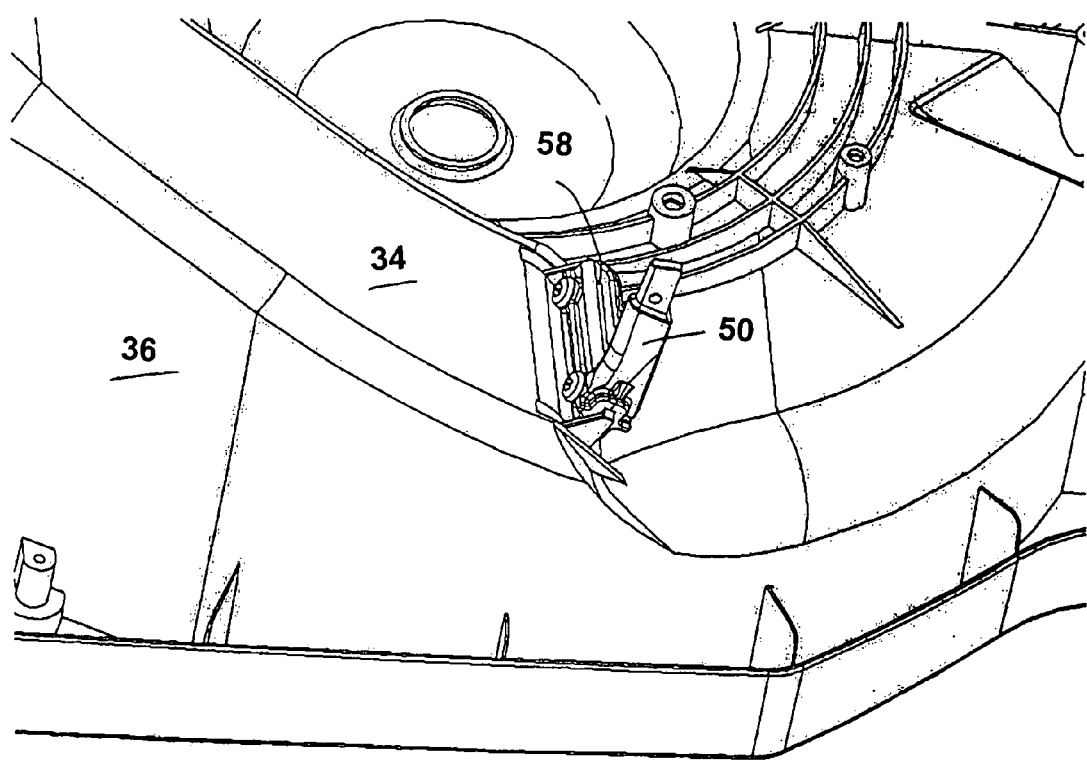
FIG. 4 is an enlarged perspective view similar to FIGS. 2 and 3, particularly illustrating the actuating handle attached to the front lip on the pivotal mulch door for pivoting the mulch door.
Figure 5:
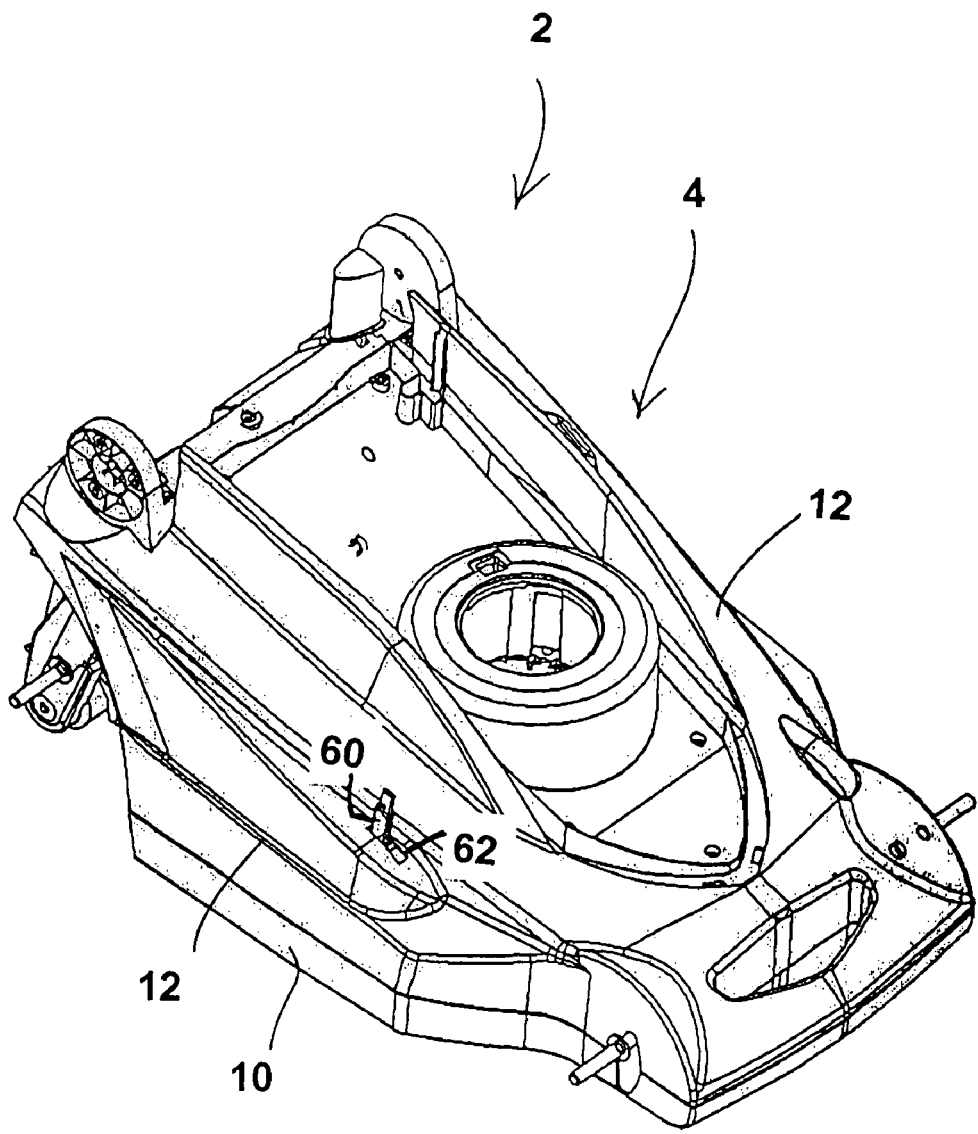
FIG. 5 is a perspective view of a portion of a lawn mower according to this invention, particularly illustrating a topside of the cutting deck with an upper overlay of the cutting deck having been mated with and secured to the lower base of the cutting deck such that the exit tunnel is obscured in FIG. 5 but showing the actuating handle extending upwardly through a slot in the cutting deck for access by an operator.
Figure 6:
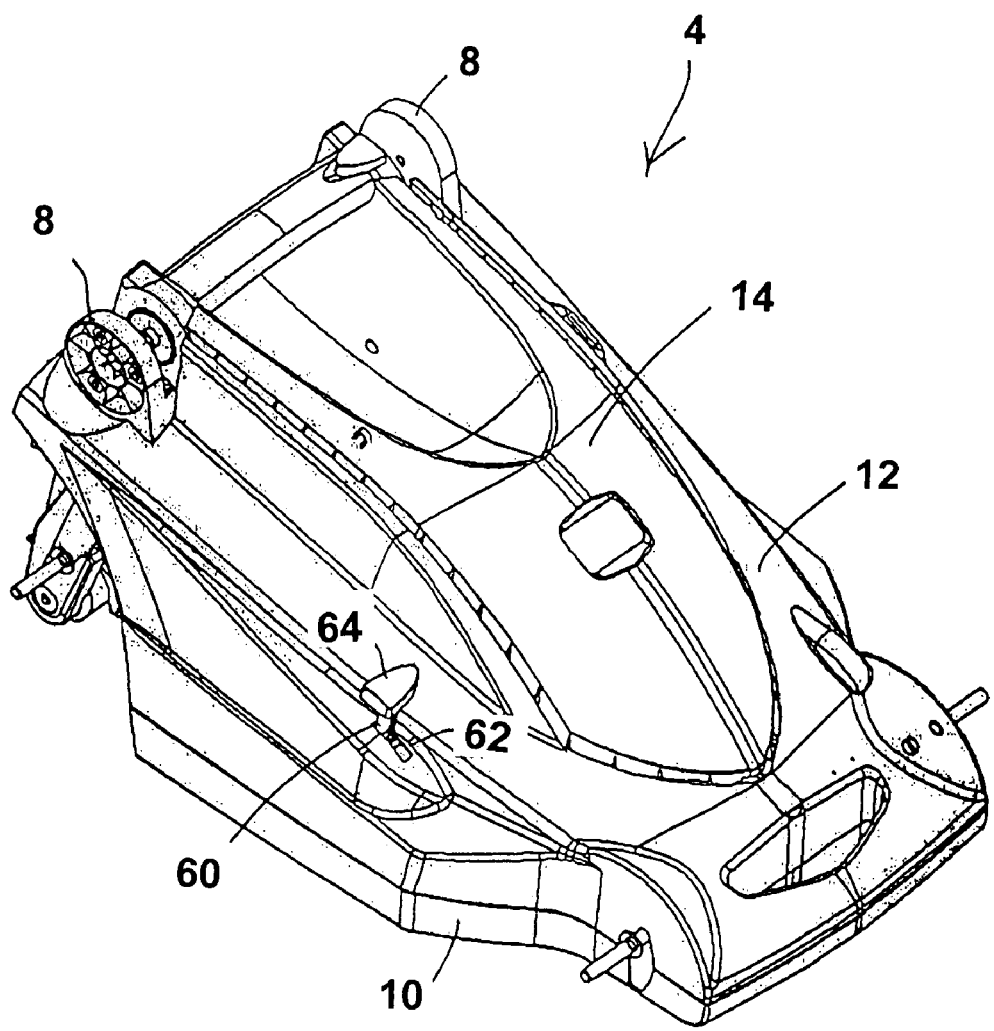
FIG. 6 is a perspective view similar to FIG. 5, particularly illustrating a knob on the top of the actuating handle to facilitate gripping the actuating handle and showing a motor shroud added to the central portion of the cutting deck.

As shown in FIG. 3, when front lip 50 of mulch door 44 is inserted through slot 52, front lip 50 extends outside of exit tunnel 18 and wing portions 51 of front lip 50 extend through side portions 53 of slot 52. As shown in FIG. 4, a saddle 58 carrying a handle 60 can be secured around front lip 50 of mulch door 44 using suitable fasteners. In manufacturing mower 2, front lip 50 of mulch door 44 is inserted through slot 52 on exit tunnel 18 and the handle carrying saddle 58 is attached thereto before lower base 10 and upper overlay 12 are secured to one another. Lower base 10 and upper overlay 12 can then be secured to one another with handle 60 sticking up through an elongated slot 62 on upper overlay 12 as shown in FIG. 5. Then, a knob 64 can be added to the top of handle 60 to allow the operator to more easily grip handle 60 as illustrated in FIG. 6.

The operator can selectively place mulch door 44 into a mulching position in which entrance 38 to exit tunnel 18 is closed and mower 2 is placed into its mulching mode of operation. This is shown in FIGS. 7-9 and 13. In this position, the shape of cutting chamber 16 retains its optimum, annular configuration in which mulching performance is enhanced. Sidewall door portion 48 of mulch door 44 fills in the missing portion of sidewall 24 and top wall door portion 46 of mulch door 44 is substantially horizontal like the missing portion of top wall 22, at least except for the forward end of top wall door portion 46 which begins to bend up to form front lip 50. While a mulch door 44 with both top wall and sidewall door portions 46 and 48 is preferred, mulch door 44 could also have only a top wall door portion 46 with sidewall 24 of cutting chamber 16 extending all the way up to mulch door 44.

If the operator wishes to place mower 2 into its discharge/collection mode of operation, the operator need only grab knob 64 on handle 60 and pull forwardly on handle 60 in the direction of the arrow B in FIG. 13. This will pivot mulch door 44 upwardly about pivot 56 formed by slot 52 in front end 30 of exit tunnel 18 as indicated by the arrow C in FIG. 13. This pivots mulch door 44 upwardly to open or clear entrance 38 to exit tunnel 18 with mulch door 44 moving up such that top wall door portion 46 lies generally flush against top wall 34 of exit tunnel 18. In this position, grass clippings can exit cutting chamber 16 and flow out through exit tunnel 18 to be discharged through rear discharge opening 42 of exit tunnel 18.

Rather than using a handle 60 and knob 64 directly attached to mulch door 44, mulch door 44 could be remotely actuated by an actuating handle located on the handle assembly of mower 2. This actuating handle would be connected to mulch door 44 by a flexible cable system or the like.

Preferably, some means is provided for holding mulch door 44 either in its closed mulching position or in its open discharge/collection position. This means preferably comprises an overcenter spring 70 located within exit tunnel 18 itself. Overcenter spring 70 has one leg 72 mounted to the rear side of mulch door 44 behind sidewall door portion 48 of mulch door 44. The other leg 74 of overcenter spring 70 is mounted in a notch 76 on one sidewall 36 of exit tunnel 18. Notch 76 is located relatively high on sidewall 24 such that the torsional center of spring 70 is up near top wall 22 of exit tunnel 18 when mulch door 44 is in its open discharge/collection position. This helps prevent grass clippings from fouling and jamming the action of overcenter spring 70.

Mulch door 44 as disclosed herein is an effective and simple way to provide a mower 2 with both a mulching mode of operation as well as a discharge/collection mode of operation. Mulch door 44 accomplishes this by closing and opening entrance 38 to exit tunnel 18 as opposed to closing and opening rear discharge opening 42 of exit tunnel 18. This prevents exit tunnel 18 from plugging with grass clippings without using a grass plug that has to be inserted into exit tunnel 18. Moreover, when mulch door 44 is closed, it substantially fills in the normal curved orientation of the sidewall 24 of cutting chamber 16 and the normal substantially horizontal orientation of top wall 22 of cutting chamber 16 to maximize mulching performance. Thus, mower 2 of this invention both effectively discharges grass clippings in the discharge/collection mode as well as mulches clippings into the cut grass path in the mulching mode of operation.

Various modifications of this invention will be apparent to those skilled in the art. Thus, this invention will be limited only by the appended claims.

I claim:

1. A lawn mower, which comprises:
   (a) a cutting deck supported for movement over the ground, wherein the cutting deck has a width that extends between opposite left and right lateral sides thereof;

(b) a single, downwardly facing cutting chamber on the cutting deck, the cutting chamber having a top wall, a substantially circular sidewall extending vertically downwardly from the top wall, and an open bottom circumscribed by the sidewall, wherein the substantially circular sidewall is generally centered on the cutting deck such that the single cutting chamber spans substantially across the width of the cutting deck with opposite side portions of the sidewall being located adjacent the left and right sides of the cutting deck;

(c) a rotatable cutting blade within the cutting chamber for cutting grass, wherein the cutting blade rotates about a substantially vertical axis of rotation with the axis of rotation being substantially centered within the substantially circular sidewall of the cutting chamber;

(d) a generally rearwardly extending exit tunnel asymmetrically located on the cutting deck with the exit tunnel being located closer to one lateral side of the cutting deck than the other lateral side of the cutting deck, wherein a front end of the exit tunnel overlies at least a portion of the cutting chamber on the cutting deck for receiving grass clippings from the cutting chamber in a discharge/collection mode of operation and for conducting such clippings to a discharge opening on the cutting deck, wherein the discharge opening in the discharge/collection mode of operation is separate and distinct from the open bottom of the cutting chamber through which the grass clippings exit in a mulching mode of operation; and (e) a pivotal mulch door located within the exit tunnel, the pivotal mulch door having an open position and a closed position, wherein the pivotal mulch door comprises both a first portion forming a portion of the top wall of the cutting chamber and a second portion forming a portion of the sidewall of the cutting chamber when the door is in the closed position, the second portion of the mulch door extending vertically downwardly from the first portion of the mulch door in the same manner that the sidewall extends vertically downwardly from the top wall, wherein the mulch door is selectively pivotal relative to the cutting chamber between the open position in the discharge/collection mode of operation and a closed position in the mulching mode of operation.

2. The mower of claim 1, wherein the mulch door is pivotally mounted to the exit tunnel by passing a lip on the mulch door through a slot on the exit tunnel.

3. The mower of claim 2, further including an upwardly extending handle secured to the lip of the mulch door for allowing an operator to pivot the mulch door in the slot of the exit tunnel.

4. The mower of claim 2, wherein the slot is located on a front end of the exit tunnel.

5. The mower of claim 1, wherein a single rotatable cutting blade rotates on the substantially vertical axis.

6. The mower of claim 5, wherein the cutting deck is part of a walk behind mower.

7. The mower of claim 1, wherein the pivotal mulch door pivots about a substantially horizontal pivot axis.

8. A lawn mower, which comprises:

(a) a cutting deck with a downwardly facing cutting chamber, the cutting chamber having a top wall, a central hub and a peripheral sidewall with the central hub and peripheral sidewall extending vertically downwardly relative to the top wall, wherein the peripheral sidewall surrounds the central hub such that an annular channel is formed beneath the top wall between the sidewall and the hub;

(b) a rotatable cutting blade contained inside the cutting chamber above a lower edge of the peripheral sidewall, the cutting blade rotating in a substantially horizontal cutting plane to create grass clippings that are received within and circulate at least partially around the annular channel of the cutting chamber;

(c) wherein at least a portion of the peripheral sidewall is fixed and is curved along a fixed sidewall curvature, and wherein and at least a portion of the peripheral sidewall of the cutting chamber above the cutting plane is pivotal to form a pivotal mulch door for opening and closing the annular channel, wherein the pivotal sidewall portion is also curved in a manner that conforms to the fixed sidewall curvature, wherein the pivotal sidewall portion is arcuately aligned with the fixed sidewall curvature when the mulch door formed by the pivotal sidewall portion closes the annular channel such that the pivotal sidewall portion serves as a smooth arcuate continuation of the fixed sidewall portion when the mulch door formed by the pivotal sidewall portion closes the annular channel; and (d) wherein the pivotal sidewall portion has a vertically slanted or inclined lower edge that progressively lowers or drops relative to the top wall from a first side to a second side of the lower edge such that the first side of the lower edge is vertically higher than the second side of the lower edge, and wherein the first side of the lower edge is a leading side and the second side of the lower edge is a trailing side taken with respect to a direction of rotation of the cutting blade within the cutting chamber.

9. The mower of claim 8, wherein the mulch door is additionally formed by at least a portion of a top wall of the cutting chamber in addition to the sidewall portion.

10. The mower of claim 8, further including a rearwardly extending exit tunnel having a front entrance for receiving grass clippings from the annular channel and a rear discharge opening for discharging the grass clippings from the exit tunnel, and wherein the mulch door is received within the exit tunnel and opens and closes the front entrance to the exit tunnel to open and close the annular channel.

* * * * *

UNITED STATES PATENT AND TRADEMARK OFFICE
CERTIFICATE OF CORRECTION

PATENT NO. : 7,367,174 B2  Page 1 of 1
APPLICATION NO. : 11/061377
DATED : May 6, 2008
INVENTOR(S) : Stephen J. Grimwade It is certified that error appears in the above-identified patent and that said Letters Patent is hereby corrected as shown below:

Column 8, Line 22, change "and wherein and at least a portion" to --and wherein at least a portion--.

Signed and Sealed this

Twenty-second Day of July, 2008

JON W. DUDAS
*Director of the United States Patent and Trademark Office*